April 22, 1969 Y. YANAI 3,440,454
HIGH RISE OF CURRENT SWITCHING CONTROLLED RECTIFIER
Filed Aug. 18, 1966
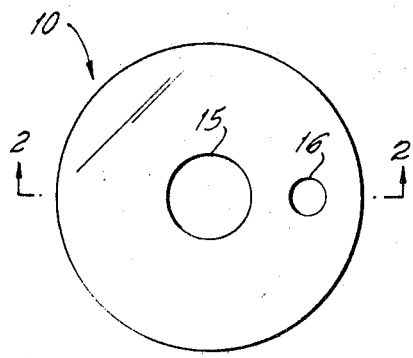
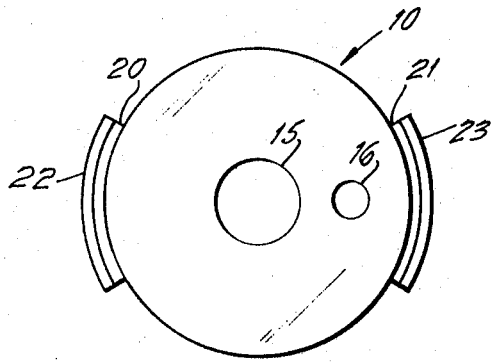
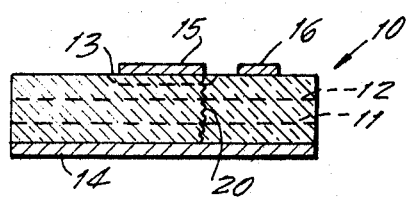
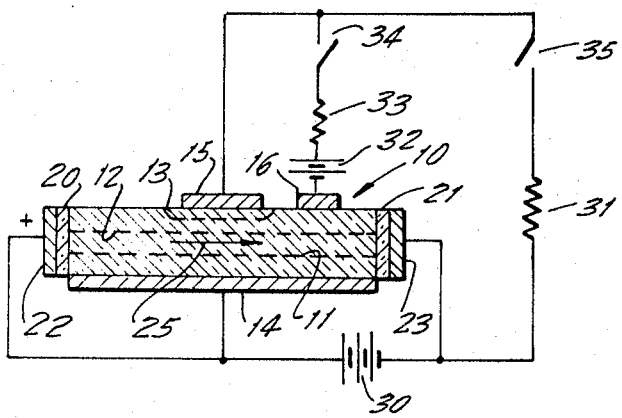
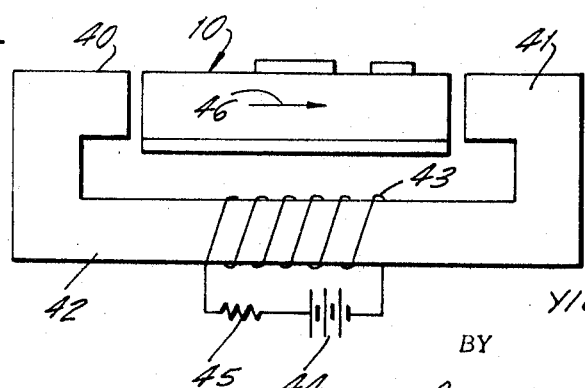
INVENTOR.
YIGAL YANAI
BY
OSTROLENK, FABER, GERB & SOFFEN
ATTORNEYS United States Patent Office 3,440,454
Patented Apr. 22, 1969

3,440,454
HIGH RISE OF CURRENT SWITCHING CONTROLLED RECTIFIER
Yigal Yanai, Givataim, Israel, assignor to International Rectifier Corporation, El Segundo, Calif., a corporation of California
Filed Aug. 18, 1966, Ser. No. 573,235
Int. Cl. H03k 3/35
U.S. Cl. 307—309                 3 Claims

ABSTRACT OF THE DISCLOSURE

An electric or magnetic field is established perpendicular to the direction of normal current flow through a controlled rectifier to cause a spreading of current carriers which begin to flow upon firing of the device in order to increase the $dI/dt$ of the controlled rectifier.

---

This invention relates to controlled rectifiers, and more specifically relates to a novel construction for controlled rectifiers which increases their ability to switch high currents at a high $dI/dt$.

It is well known that precautions must be taken in the application of controlled rectifiers to limit the rate of rise of current during switching to prevent damage to the device. This precaution is necessary since a controlled rectifier will not become immediately fully conductive when a suitable gate signal is applied thereto; but, conversely, a small filament of current will initially flow with this filament spreading out over the area of the controlled rectifier in a finite time before the rectifier is turned fully on. During the initial conduction of the small filament, the resistance within the controlled rectifier is relatively high and decreasing. However, if during this high resistance period a substantial current is applied through the device, it is possible to exceed the power capabilities of the controlled rectifier and cause its damage or destruction. For this reason, it has been necessary to limit the rate of rise of current in the controlled rectifier device during switching.

The principle of the present invention is to provide a novel auxiliary means which will assist in the rapid spreading of the initial conducting filament and cause the filament to propagate in a lateral direction over the area of the controlled rectifier at a speed greater than its natural propagation velocity which typically could be of the order of $\frac{1}{10}$ mm. per microsecond.

In accordance with a first embodiment of the invention, suitable electrodes are attached to the periphery of the controlled rectifier so arranged as to generate an electric field generally perpendicular to the direction of flow of current through the device. This electric field will then tend to sweep the filament laterally, thereby increasing its natural propagation velocity and permitting the device to be turned fully on in a shorter time. Thus, the $dI/dt$ of the device can be increased.

As a second embodiment of the invention, a magnetic field is applied to the device perpendicular to the direction of current flow therethrough, again increasing the speed of lateral propagation of the initial current conducting filament.

Accordingly, a primary object of this invention is to increase the turn-on time of a controlled rectifier.

Yet another object of this invention is to increase the $dI/dt$ capability of a controlled rectifier.

A still further object of this invention is to provide auxiliary means for assisting in the lateral propagation of the initial conducting filament which is created when a controlled rectifier is initially turned to its ON condition.

These and other objects of this invention will become apparent from the following description when taken in connection with the drawings, in which:

FIGURE 1 is a top view of a typical controlled rectifier well known in the prior art.

FIGURE 2 is a cross-sectional view of FIGURE 1 taken across the line 2—2 in FIGUR E1.

FIGURE 3 is a view similar to FIGURE 2 which adds thereto a pair of spaced electrodes for the generation of an electric field to increase the lateral propagation of the initial conducting filament created when the controlled rectifier is initially turned to its ON condition.

FIGURE 4 is a top view of FIGURE 3.

FIGURE 5 shows a second embodiment of the invention wherein a magnetic field is generated along the length of the wafer forming the controlled rectifier.

Referring first to FIGURES 1 and 2, I have illustrated therein a typical controlled rectifier device which could be formed of a wafer of silicon 10 of one of the conductivity types which has formed therein three junctions 11, 12 and 13. An anode electrode 14 is connected to the bottom surface of the device and a cathode electrode 15 connected to the region above junction 13, while the gate electrode 16 is connected to the region above junction 12.

In such devices, and when the device is initially turned to its ON condition by the appropriate connection of a gate signal to gate 16, the device will begin initially to conduct a fine filament of current from anode 14 to cathode 15, shown as line 19 in FIGURE 2. This filamentary current will have a natural lateral propagation velocity until the entire region between anode 14 and cathode 15 becomes completely conductive.

Since this original filamentary current 19 is associated with a relatively high resistance, as pointed out before, it becomes necessary to limit the possible rate of rise of current by the use of appropriate external circuitry, since if the current magnitude rises too quickly, it will cause damage to the device which still has a relatively high resistance.

The principle of the present invention is to provide additional means for assisting in the lateral propagation of the initial filamentary current.

FIGURES 3 and 4 illustrate the manner in which an electric field is introduced into the wafer in such a direction as to assist in the lateral spread of the current carriers. In FIGURE 3 components similar to those of FIGURES 1 and 2 have similar identifying numerals, and it will be seen that a portion of the periphery of the wafer 10 receives insulation sections 20 and 21 which may be deposited on the rim by any desired technique, with these insulation sections 20 and 21 thereafter being plated with conductive electrodes 22 and 23, respectively.

When a source of voltage is now connected across conductive electrodes 22 and 23, it will be apparent that an electric field will be established across the wafer in the direction of arrow 25 in FIGURE 3, whereby the carriers passing through this electric field will tend to be laterally displaced by the field, thereby to increase the propagation of the carriers forming the initial current filament 19 in FIGURE 2. Thus, the $dI/dt$ of the device will be increased.

FIGURE 3 further illustrates the manner in which the main voltage source 30, which is used in the circuit controlled by the controlled rectifier 10, can also be used to set up the desired propagating field 25. In FIGURE 3, the voltage source schematically illustrated as battery 30, is connected in series with anode 14, cathode 15 and load 31. The gate circuit is then comprised of a suitable biasing source 32 connected in series with a resistor 33 and a switch 34 which is closed when the device is to begin conduction. A switch 35 is also contained in the main circuit to open the circuit and extinguish the controlled rectifier when desired.

As seen in FIGURE 2, the same main voltage source 30 which is to drive the circuit controlled by the controlled rectifier may be used as the electrostatic field generating means for increasing lateral propagation speed.

While FIGURES 3 and 4 illustrate the use of an electrostatic field as the means for increasing propagation speed, it will also be apparent that a magnetic circuit could also be used.

Thus, in FIGURE 5, the controlled rectifier 10 is shown connected between pole faces 40 and 41 of a magnetic circuit 42 which is energized by a winding 43 connected to a suitable voltage source 44 in series with resistor 45.

In operation, a magnetic field 46 will be established through the wafer, thereby tending to cause the current carriers in filament 20 to move laterally from the initial filament 20 of FIGURE 2.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A high $dI/dt$ controlled rectifier comprising a wafer of semiconductor material having four layers of alternate conductivity types, an anode electrode connected to one layer on one surface of said wafer, a cathode electrode and a gate electrode connected to fourth and third layers respectively on the opposite surface of said wafer, and field generating means for generating a field through said wafer in a direction generally perpendicular to the direction of current flow between said cathode electrode and said anode electrode; said field generating means including first and second spaced electrodes connected to opposite peripheral regions of said wafer adjacent three of said layers but insulated therefrom, and voltage source means connected to said spaced first and second electrodes; said field characterized in causing a lateral force on current carriers flowing from said anode electrode to said cathode electrode, thereby to accelerate the lateral propagation of current carriers flowing from said anode electrode to said cathode electrode.

2. The device as set forth in claim 1 wherein said field is an electric field.

3. The device as set forth in claim 1 wherein said field is a magnetic field.

References Cited

UNITED STATES PATENTS

| 3,072,803 | 1/1963 | Sato | 307—88.5 |
| 3,268,782 | 8/1966 | Weinstein | 317—235 |
| 3,274,400 | 9/1966 | Weinstein | 307—88.5 |
| 3,356,862 | 12/1967 | Diebold et al. | 307—88.5 |

FOREIGN PATENTS

| 657,345 | 2/1963 | Canada. |
| 702,279 | 1/1965 | Canada. |
| 1,015,992 | 1/1966 | Great Britain. |

JOHN W. HUCKERT, *Primary Examiner.*

J. R. SHEWMAKER, *Assistant Examiner.*

U.S. Cl. X.R.

317—235; 307—305, 308